(12) United States Patent
Patelczyk et al.

(10) Patent No.: US 6,669,278 B2
(45) Date of Patent: Dec. 30, 2003

(54) AUTOMOTIVE VEHICLE ROOF SYSTEM HAVING MULTIPLE SUNROOFS

(75) Inventors: Jeffrey S. Patelczyk, Cumming, GA (US); Gregory M. Beauprez, Toledo, OH (US); Christopher C. Dowdey, Grosse Ile, MI (US); Bernard W. Schaller, Flat Rock, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/105,888

(22) Filed: Mar. 25, 2002

(65) Prior Publication Data

US 2002/0158491 A1 Oct. 31, 2002

Related U.S. Application Data

(63) Continuation-in-part of application No. 09/525,877, filed on Mar. 14, 2000, now abandoned.

(51) Int. Cl.[7] ............................. B60J 7/047; B60J 7/053
(52) U.S. Cl. ................. 296/220.01; 296/222; 296/223; 296/224
(58) Field of Search ..................... 296/216.02, 222, 296/220.01, 223, 224

(56) References Cited

U.S. PATENT DOCUMENTS

| | | | |
|---|---|---|---|
| 3,036,860 A | 5/1962 | Geiger | |
| 3,075,807 A | 1/1963 | Werner | |
| 3,550,948 A | 12/1970 | Thompson, Jr. | |
| 4,121,870 A | 10/1978 | Oakey | |
| 4,143,908 A | 3/1979 | Dix | |
| 4,157,845 A | 6/1979 | Queveau | |
| 4,178,036 A | 12/1979 | Kalitz | |
| 4,185,868 A | 1/1980 | Kaltz et al. | |
| 4,741,573 A | * 5/1988 | Yokota | ........................ 296/223 |
| 4,852,938 A | 8/1989 | Hirshberg et al. | |
| 4,893,868 A | 1/1990 | Miller et al. | |
| 4,923,244 A | 5/1990 | Clenet | |
| 4,940,283 A | 7/1990 | Androy | |
| 5,029,937 A | 7/1991 | Yamamoto | |
| 5,145,231 A | 9/1992 | Gotomyo | |
| 5,147,107 A | * 9/1992 | Yamauchi et al. | .......... 296/214 |
| 5,261,722 A | 11/1993 | Staley et al. | |
| 5,303,970 A | 4/1994 | Young et al. | |
| 5,746,475 A | 5/1998 | Caye et al. | |
| 5,961,177 A | 10/1999 | Caye et al. | |
| 6,073,995 A | 6/2000 | Klein | |

FOREIGN PATENT DOCUMENTS

| | | |
|---|---|---|
| DE | 441648 | 3/1927 |
| GB | 259555 | 3/1927 |
| GB | 386150 | 1/1933 |
| GB | 1 377 679 | 12/1974 |
| GB | 2 002 697 A | 2/1979 |
| JP | 56-112318 | 9/1981 |
| JP | 60-71327 | 4/1985 |
| JP | 0205514 | * 9/1986 ................. 296/223 |
| JP | 4-71926 | 3/1992 |
| JP | 4-212624 | 8/1992 |

OTHER PUBLICATIONS

Ward's Autoworld, "Ward's Wrapup", Mar. 1999, pp. 9 and 10.

* cited by examiner

Primary Examiner—Dennis H. Pedder
(74) Attorney, Agent, or Firm—Harness, Dickey & Pierce, P.L.C.

(57) ABSTRACT

A preferred embodiment of an automotive vehicle roof system includes first, second and third movable sunroof panels. A further aspect of the present invention provides a pair of sunroof panels that are slidable toward each other in a cross-car direction and a third movable sunroof located rearward of at least one of the pair of sunroof panels.

17 Claims, 16 Drawing Sheets

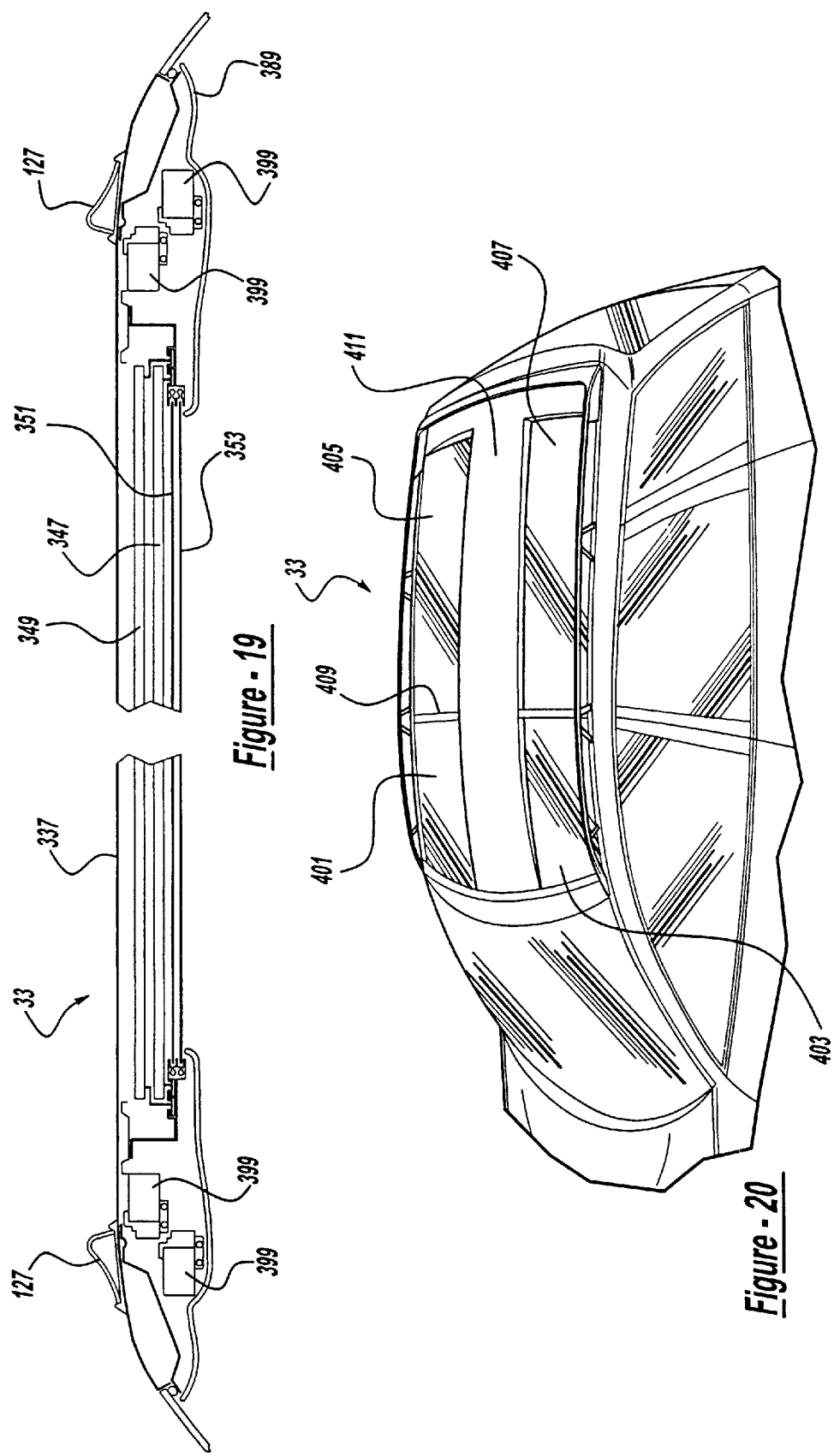

AUTOMOTIVE VEHICLE ROOF SYSTEM HAVING MULTIPLE SUNROOFS

CROSS REFERENCE TO RELATED APPLICATION

This application is a continuation-in-part of co-pending U.S. application Ser. No. 09/525,877 filed Mar. 14, 2000 now abandoned, which is incorporated herein by reference.

BACKGROUND AND SUMMARY OF THE INVENTION

The present invention relates generally to automotive vehicle roofs and more specifically to a roof system having multiple sunroofs.

It is well known to provide sunroofs in automotive vehicles. Most sunroofs are either spoiler-type or below roof "moon roof" sunroofs. Spoiler sunroofs have a panel that is rearwardly moved from a closed position, to a tilted venting position, and then to a tilted open position above the stationary roof. Conventional below roof sunroofs have a panel that is rearwardly slid from a closed position to an open position below a stationary roof; the panel may also be tilted to a venting position prior to opening. It is also known to use "pop top" sunroofs which tilt to a venting position about a fixed pivot axis.

Vehicle users have recently desired a maximum roof opening especially when styling of vehicles has caused the windshield and front header panel to be moved further rearward in the vehicle. Thus, various recent sunroof systems have been developed which employ a pair of sunroofs. Such constructions are disclosed in U.S. Pat. No. 5,961,177 entitled "Sunroof Assembly Drain Trough for an Automotive Vehicle" which issued to Caye et al. on Oct. 5, 1999; U.S. Pat. No. 5,145,231 entitled "Roof Structure of an Automotive Vehicle" which issued to Gotomyo on Sep. 8, 1992; and U.S. Pat. No. 4,185,868 entitled "Electrically Operated Hatch Roofs" which issued to Kaltz et al. on Jan. 29, 1980. While some of the patents have significantly improved the art, a demand still exists to further increase the sunroof opening size, especially directly over the vehicle passengers' heads.

In accordance with the present invention, a preferred embodiment of an automotive vehicle roof system includes first, second and third movable sunroof panels. A further aspect of the present invention provides a pair of sunroof panels that are slidable toward each other in a cross-car direction and a third movable sunroof located rearward of at least one of the pair of sunroof panels. In another aspect of the present invention, at least a pair of front sunroof panels can be opened toward each other in a cross-car direction and a pair of rear sunroof panels can be opened toward each other in a cross-car direction. Yet another aspect of the present invention employs a first mechanism operable to slide a first sunroof panel and a second mechanism operable to pivotably lower a first peripheral edge of a second panel without lowering an opposite peripheral edge of the second panel an equivalent distance, if at all, during retraction.

The automotive vehicle roof system of the present invention is advantageous over traditional constructions in that the present invention maximizes the open roof area directly above the vehicle passengers. The present invention also achieves independent movement of multiple sunroof panels. Furthermore, the cross-car orientation of the present invention roof system simplifies various of the sunroof panel driving mechanisms, thereby reducing cost, head room intrusion inside the vehicle, and weight, while improving reliability. The sunroof opening area is also located closer to the side rails as compared to conventional devices due to the cross-car positioning of the sunroof tracks. Additional advantages and features of the present invention will become apparent from the following description and appended claims, taken in conjunction with the accompanying drawings.

BRIEF DESCRIPTION OF THE DRAWINGS

FIG. 19 is a cross sectional view, taken along line 19—19 of FIG. 18, showing the sunroof panels and sunshades of the third preferred embodiment automotive vehicle roof system, disposed in open positions;

FIG. 20 is a perspective view showing a fourth preferred embodiment of an automotive vehicle roof system of the present invention, with sunroof panels disposed in closed positions;

DETAILED DESCRIPTION OF THE PREFERRED EMBODIMENTS

Figure 1:
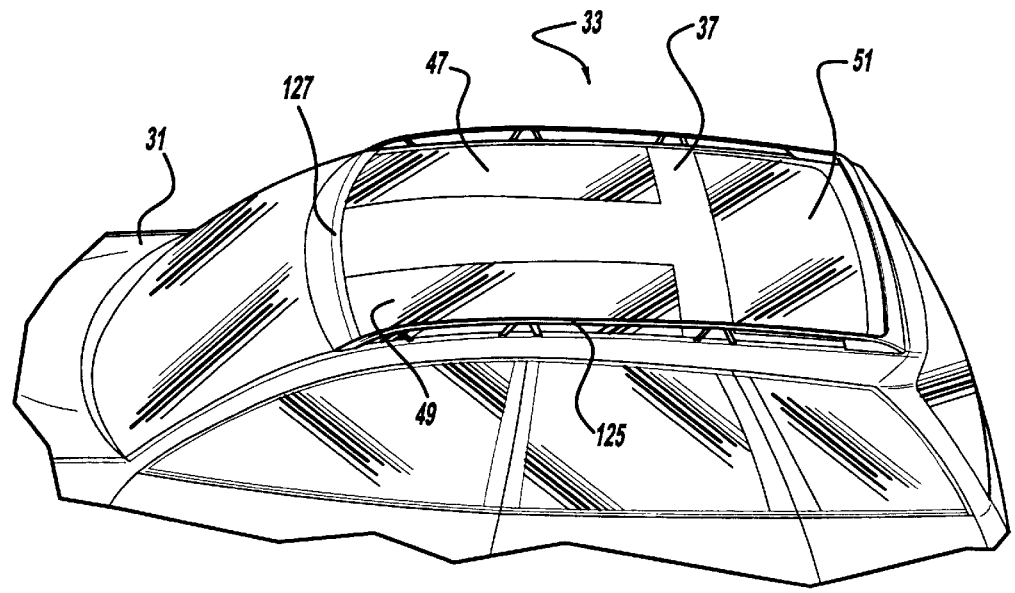
FIG. 1 is a perspective view showing a first preferred embodiment of an automotive vehicle roof system of the present invention, with roof panels disposed in closed positions.

FIGS. 1–5 show a first preferred embodiment of a modular roof system 33 employed in an automotive vehicle 31, such as a mini van, sport utility vehicle or station wagon. Modular roof system 33 includes a stationary roof portion 37 which has three sunroof openings 39, 41 and 43. Stationary roof 37 has a T-shaped middle segment 45 separating the sunroof openings. The front sunroof openings 39 and 41 are elongated in a fore-and-aft vehicle direction while the rear sunroof opening 43 is elongated in a cross-car direction, generally perpendicular to the fore-and-aft direction. Once installed, front sunroof openings 39 and 41 are disposed above the first and second passenger seating rows while rear sunroof opening 43 is disposed above a rearmost third passenger seating row.

Figure 17:
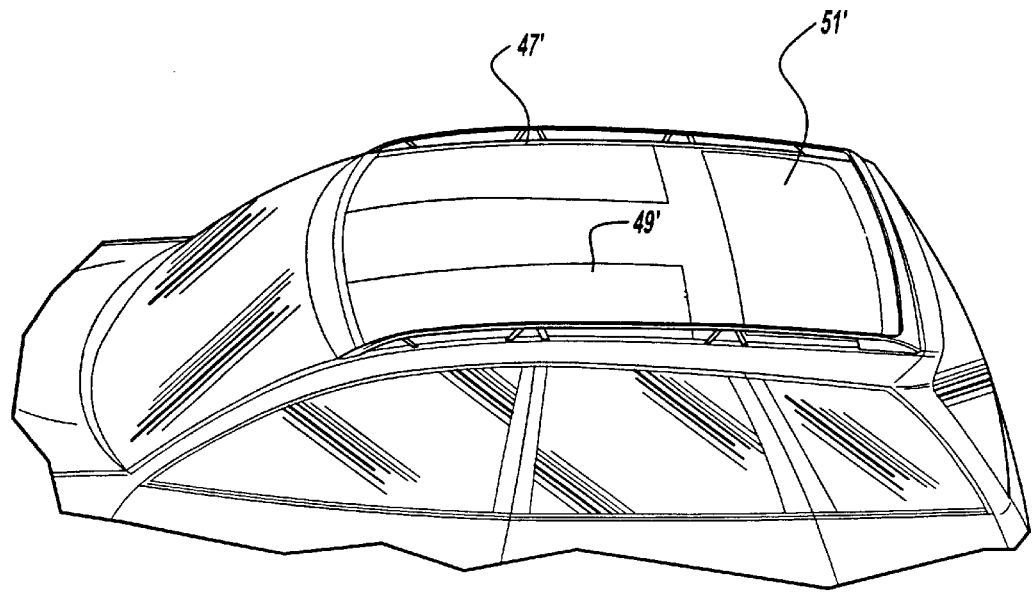
FIG. 17 is a perspective view showing an alternate embodiment, similar to that of FIG. 1, of the automotive vehicle roof system of the present invention, with sunroof panels disposed in closed positions.

A first front sunroof panel 47 corresponds with front sunroof opening 39, a second glass sunroof panel 49 corresponds with the other front sunroof opening 41, and a third glass sunroof panel 51 corresponds with rear sunroof opening 43. Alternately, one or more of the glass sunroof panels may be replaced by metal or polymeric sunroof panels 47', 49' and 51' as shown in FIG. 17.

Returning to the presently preferred embodiment of FIGS. 1–7, a pair of linkage mechanisms 53 and 55 movably attach sunroof panel 47 to corresponding extruded aluminum tracks 57 and 59. Additional linkage mechanisms (which will be described in more detail with regard to FIGS. 13 and 14) movable couple second sunroof panel 49 to tracks 57 and 59.

A steel front header reinforcement panel 81 and a rear header reinforcement panel 83 are welded or adhered to an inside surface of stationary roof panel 37 prior to assembly of the sunroof module into the vehicle. A pair of steel side rail panels 85 are also welded or adhered to side segments 87 of stationary roof panel 37 prior to assembly of the sunroof module into the vehicle. Additional roof supporting structure is provided by a cross-car bow 90, an upper cross-car reinforcement 89 and a lower cross-car reinforcement 91, all of which are welded or adhered to each other or to the cross-car middle portion of middle segment 45. A spine reinforcement 93, an upper centerline reinforcement panel 95 and a lower centerline reinforcement panel 97 are also welded to or adhered to each other or to the fore-and-aft portion of middle segment 45. Four fractional horsepower, direct current, electric motors 99 are all mounted to one of the cross-car reinforcing members below structural roof panel 37.

Front header reinforcement 81, side rail structure 85 and rear header reinforcement 83 are operable to be vertically dropped into and then fastened to pockets 98 (see FIG. 6 and 7) disposed in a vehicle front header assembly 100, vehicle side rail assembly 102 and vehicle rear header assembly, which are all part of the vehicle structure.

A resin-impregnated foam or fiberglass interior trim panel, known as a headliner 101, is fastened to the underside of the structural reinforcements, headers and side rails. The unique side-by-side positioning of the front sunroof openings 39 and 41 advantageously allows for use of one or more overhead interior consoles 103 located along the centerline of the vehicle. Such consoles may provide reading lamps, courtesy lamps, garage door openers, sunglass storage compartments, compass modules, radios, communication devices, heating/ventilation/air conditioning duct work or the like. The modularized construction of the present invention allows for the three sunroofs, stationary roof panel 37, reinforcing structure and interior trim to be assembled off line, shipped and installed into the final vehicle, in a generally vertical drop-in manner, as a single unit. This encourages improved quality inspections, assembly ergonomics, and part integration while also reducing assembly time and costs.

Figure 3:
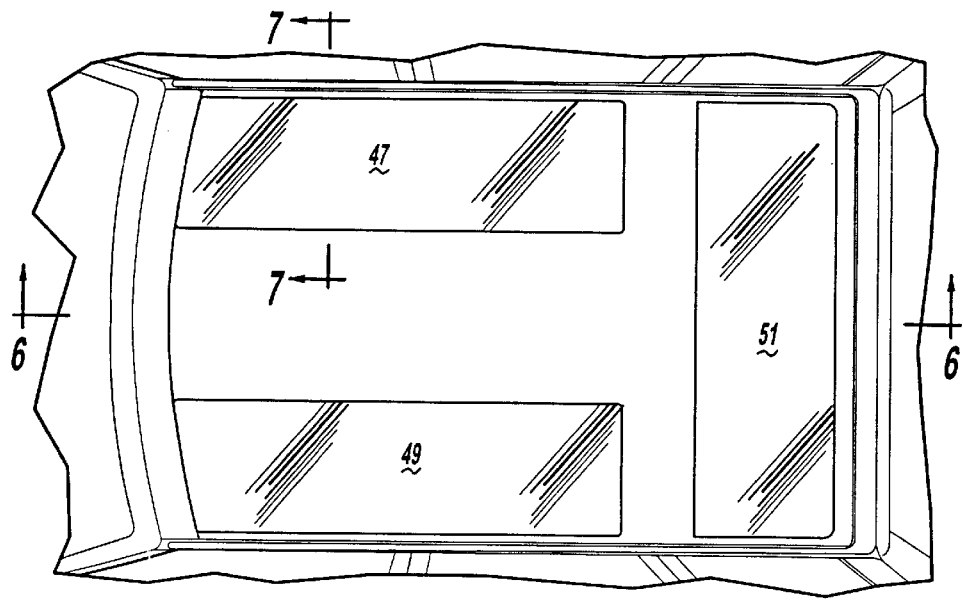
FIG. 3 is a top elevational view showing the first preferred embodiment automotive vehicle roof system, with the sunroof panels disposed in closed positions.
Figure 4:
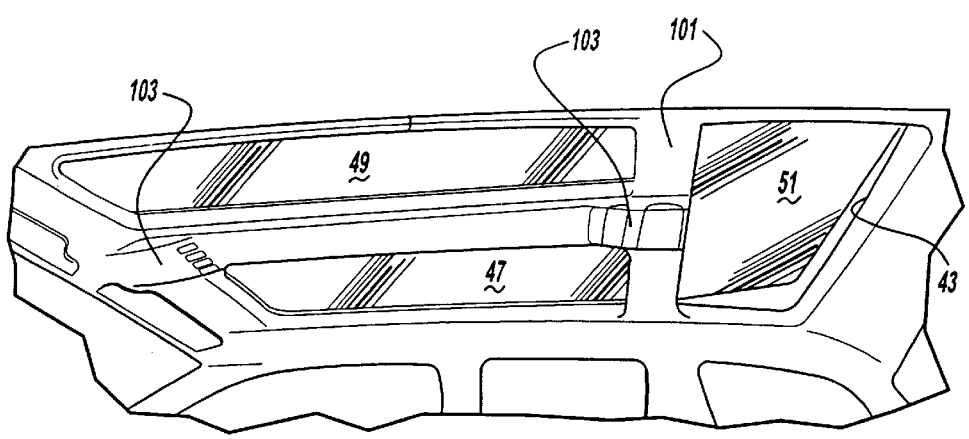
FIG. 4 is a perspective view, taken from inside the vehicle, showing the first preferred embodiment automotive vehicle roof system, with the front sunroof panels disposed in closed positions, the rear sunroof panel disposed in the venting position, and sunshades disposed in open positions.
Figure 7:
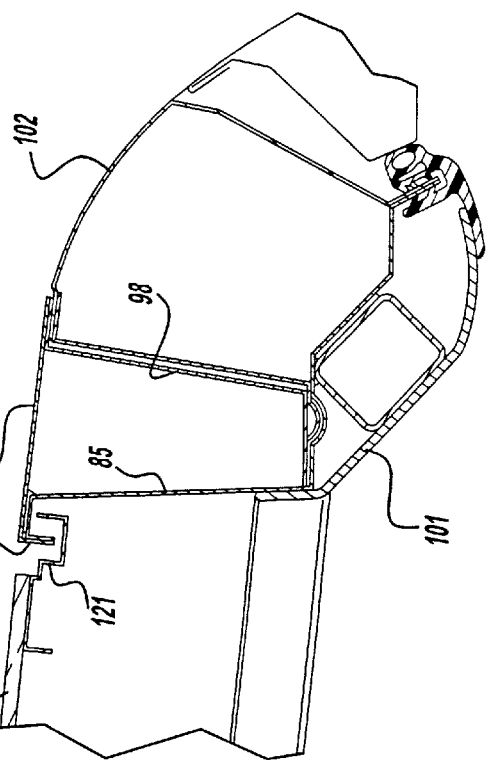
FIG. 7 is a fragmentary, cross sectional view, taken along line 7—7 of FIG. 3, showing the first preferred embodiment automotive vehicle roof system, with a front sunroof panel disposed in its closed position.

Sunroof panels 47, 49 and 51 are shown in their fully closed positions in FIGS. 1, 3 and 7. In this position, a roll form metal drain trough 121 is adhered to the bottom side of each front sunroof panel 47 and 49. This is illustrated in FIG. 7. A weatherstrip (not shown) is fastened to a downwardly turned flange 123, surrounding front sunroof openings 39 and 41, for sealing engagement with drain trough 121. This achieves a fixed water management system without requiring extraneous moving drain trough components. The three panel configuration further provides approximately 70 percent roof open space when retracted, especially in the fore-and-aft direction. It also allows for use of a roof rack 125 (see FIG. 1), by providing significant structural rigidity to the fixed roof portion, especially along the vehicle centerline. An air deflector function can also be integrated into roof rack 125 by providing a raised polymeric member 127 above front header panel 81 (see FIG. 5) and the corresponding portion of stationary roof panel 37. Roof rack 125 is also preassembled to the sunroof module.

Figure 6:
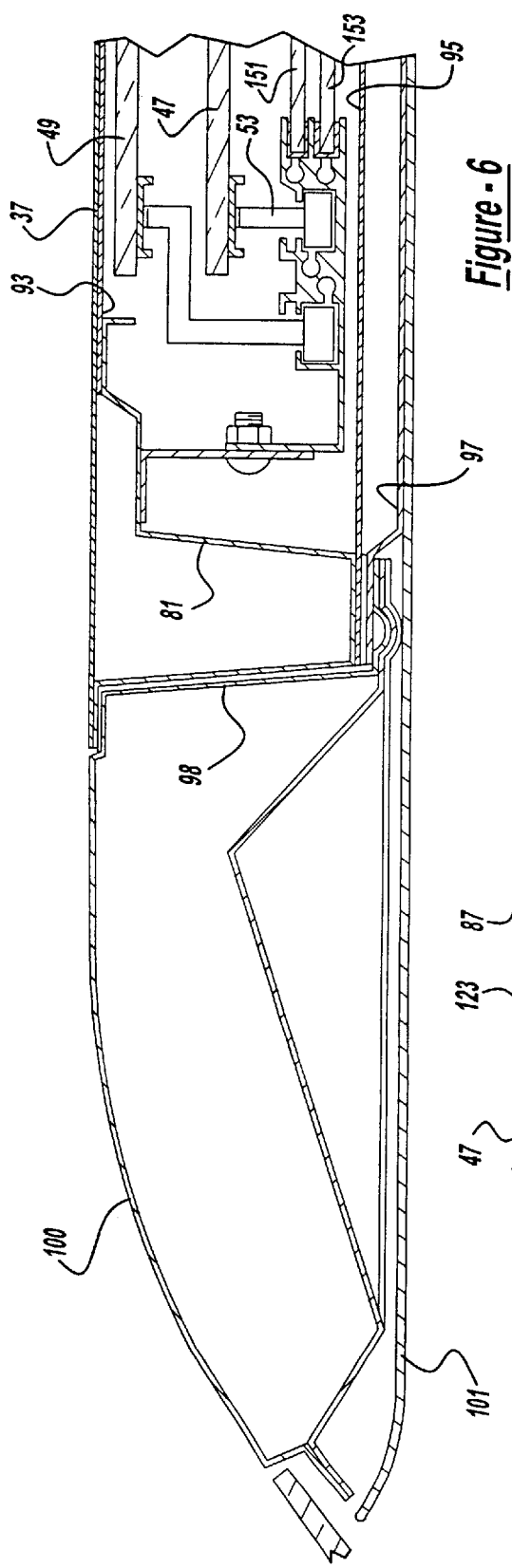
FIG. 6 is a fragmentary, cross sectional view, taken along line 6—6 of FIG. 3, showing the first preferred embodiment automotive vehicle roof system, with the front sunroof panels and sunshades disposed in open positions.

Front sunroof panels 47 and 49 slidably retract from their closed positions to fully open positions disposed below the centerline portion of middle segment 45 of stationary roof 37. Intermediate partially open positions are also possible. Sunroof panel 47 is shown in its fully open position in FIG. 2. Thus, FIG. 6 shows the overlapping nature of the sunroof panels 47 and 49 below spine reinforcement 93 and stationary roof panel 37 at the vehicle centerline. A pair of cloth covered, rigid sliding sunshades 151 and 153 are also movable from covering positions below the closed sunroof panels 47 and 49 to retracted and fully open positions also below the centerline portion of stationary roof panel 37. Thus, sunroof panels 47 and 49, as well as sunshades 151 and 153, are slidable in a cross-car direction and stowed in a below-roof manner.

Figure 8:
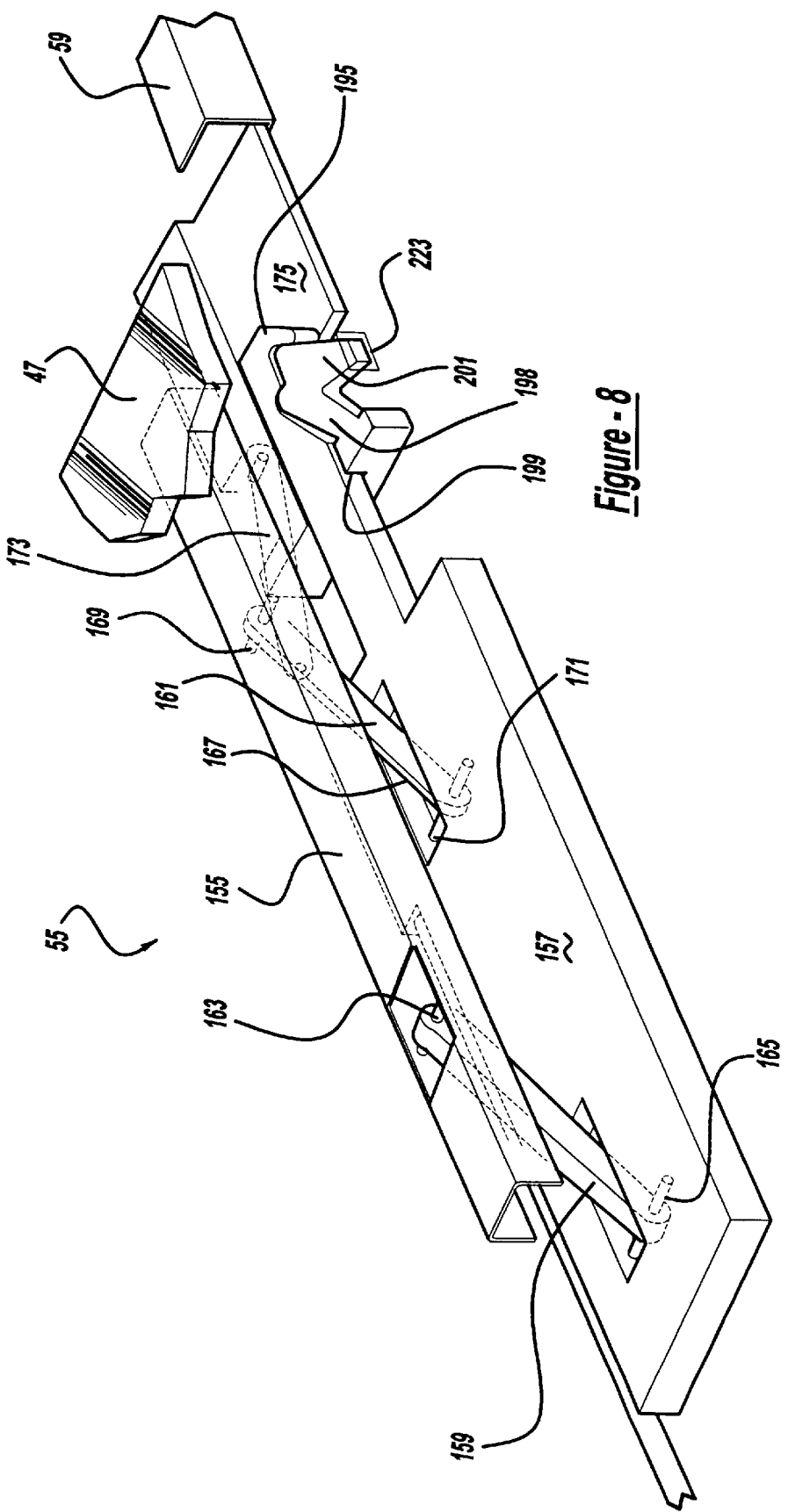
FIG. 8 is a perspective view showing a first linkage mechanism employed in the first preferred embodiment automotive vehicle roof system, disposed in a lowered and partially open position.
Figure 9:
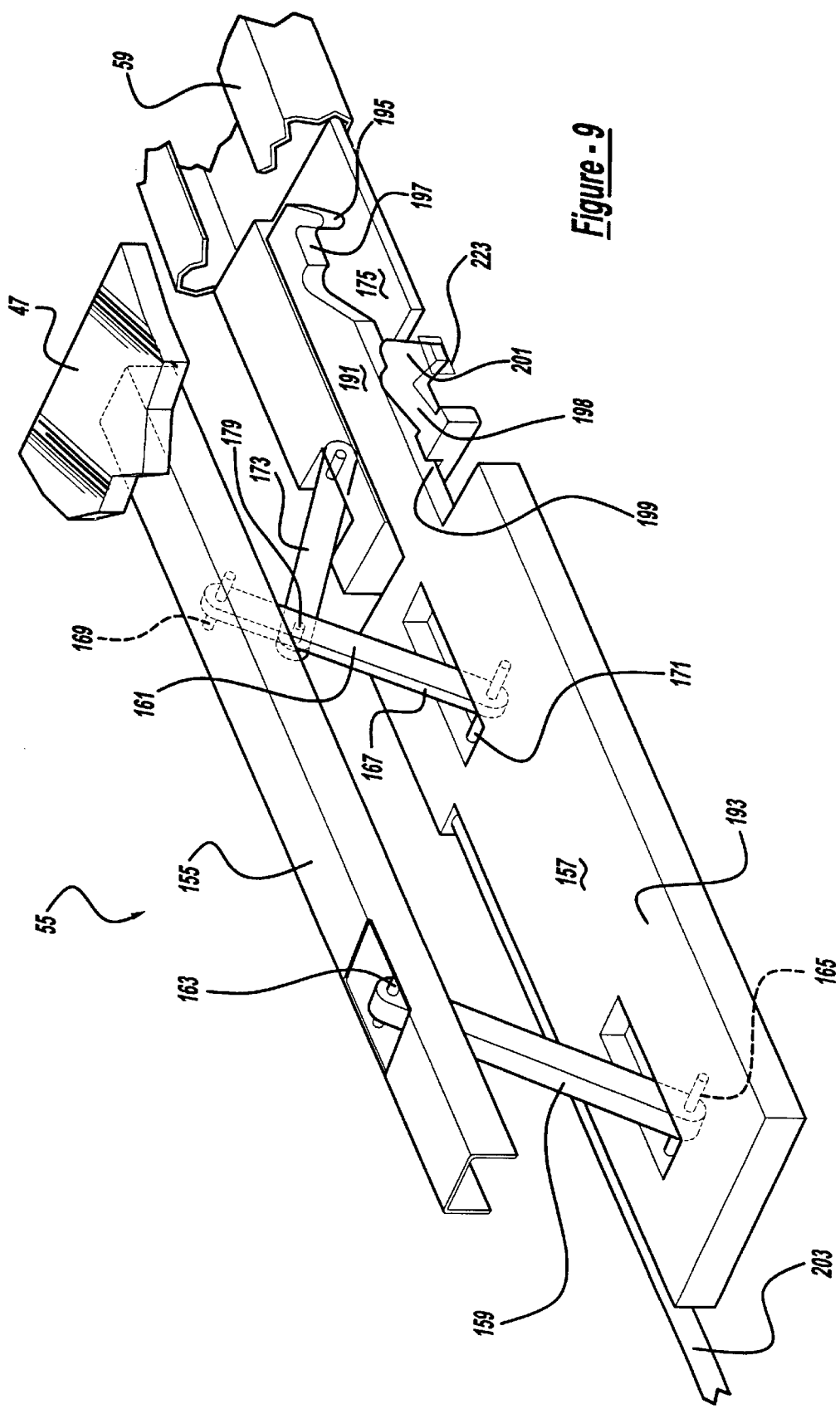
FIG. 9 is a perspective view showing the first linkage mechanism of the first preferred embodiment automotive vehicle roof system, disposed in a raised and closed position.

The sunroof driving mechanism for the rear section of first sunroof panel 47 is best shown in FIGS. 8–10. An inverted U-shaped, metal carriage 155 is adhesively bonded to a bottom surface of sunroof panel 47, below a blackout ceramic frit. An intermediate disengagable retainer can also be employed. A slide block 157, movably engaged in extruded rear track 59, is coupled to carriage 155 by way of a leading linkage 159 and a rear scissor linkage assembly 161. A pivot pin 163 rotatably couples a distal end of leading linkage 159 to carriage 155 while another pivot pin 165 couples a proximal end of leading linkage 159 to block 157. Scissor linkage 161 consists of a primary link 167, and a secondary link 173. Primary link 167 is rotatably coupled to carriage 155 by way of pivot pin 169, and to block 157 by way of another pivot pin 171. Secondary link 173 is rotatably connected to a lifting block 175 by a pivot pin 177, and to a generally middle section of primary link 161 by a pivot pin 179.

A cross-car oriented and elongated arm 191 projects from a main body 193 of slide block 157. A leading hook 195 transversely projects from arm 191 adjacent an undercut 197. Lifting block 175 has a central channel 199 slidably receiving arm 191. A trailing hook 201 transversely projects from lifting block 175 on an opposite side of channel 199 from secondary link 173. Hooks 195 and 201 project rearward in the vehicle. A sunroof cable 203 is connected to slide block 157. Cable 203 is of a conventional sunroof variety having a spiral wire core, cloth or flocked covering and an outer wound wire operable to engage gear teeth of an output gear mounted on the corresponding electric motor 99 (see FIG. 5). Blocks 157 and 175 are preferably injection molded from an engineering grade polymer and linkages 159 and 161 are preferably made from metal.

Figure 10A:
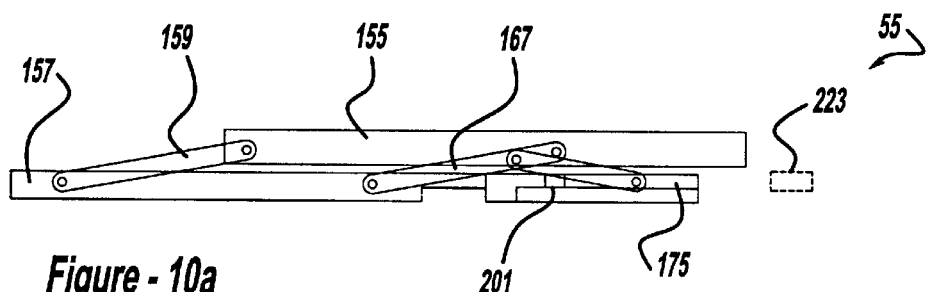
FIGS. 10a–10d are a series of diagrammatic rear elevational views showing the movement sequence of the first linkage mechanism employed in the first preferred embodiment automotive vehicle roof system, as moved from the open position to the closed position.

The operation of linkage mechanism 55 is as follows. FIGS. 9 and 10d illustrate linkage mechanism 55 disposed in the fully closed sunroof position. In this position, hook 201 transversely projects through a square hole 223 located in an upstanding wall of track 59. This creates a detented position to maintain the sunroof panel 47 in its fully closed position even when the system is exposed to normal automotive vehicle vibration and usage on bumpy roads. Referring to FIG. 10c, energization of electric motor actuator 99 pulls cable 203 and slide block 157 toward the vehicle centerline. Slide block 157 initially slides independently from the still stationary lifting block 175, which causes leading linkage 159 and scissor linkage 161 to partially collapse. Further movement of slide block 157 relative to lifting block 175 causes hook 195 to engage hook 201 while continuing to collapse leading linkage 159 and scissor linkage 161. Hook 201 has a flexible shank 198 that allows hook 201 to bend toward elongated arm 191 as hook 201 engages undercut 197 of hook 195. This serves to transversely withdraw hook 201 from hole 223.

Figure 5:
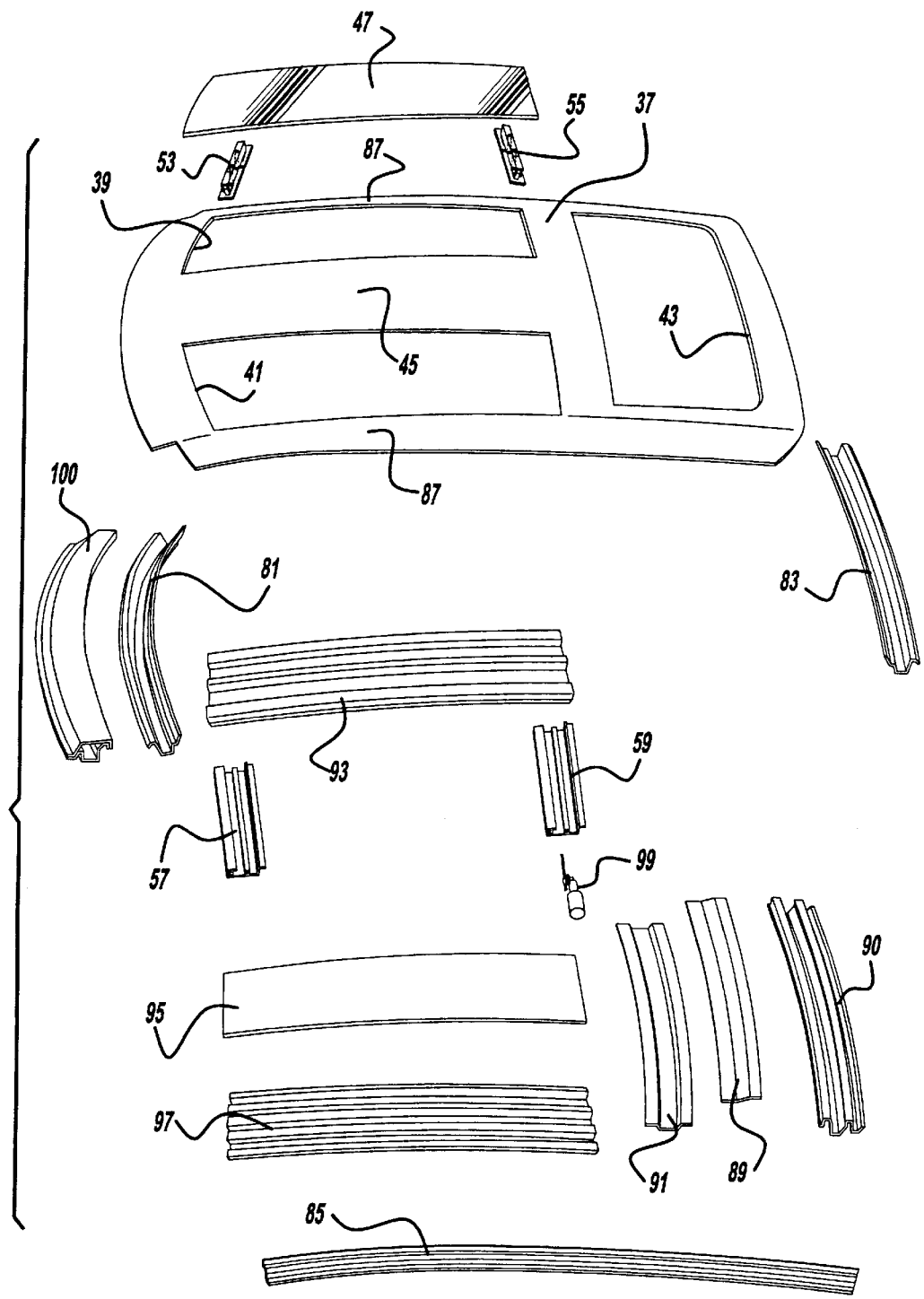
FIG. 5 is an exploded perspective view showing portions of the first preferred embodiment automotive vehicle roof system.
Figure 10B:
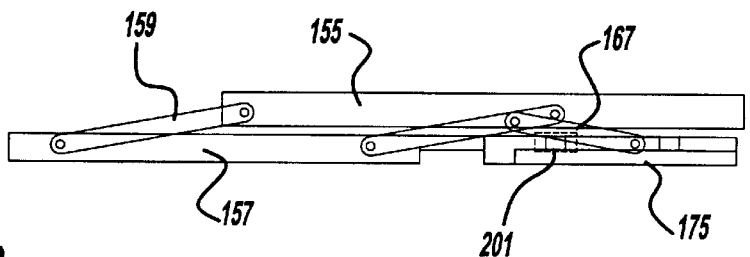
Figure 10C:
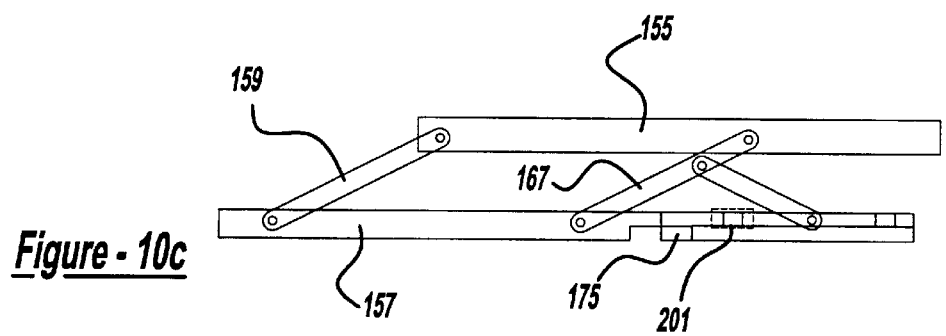
Figure 10D:
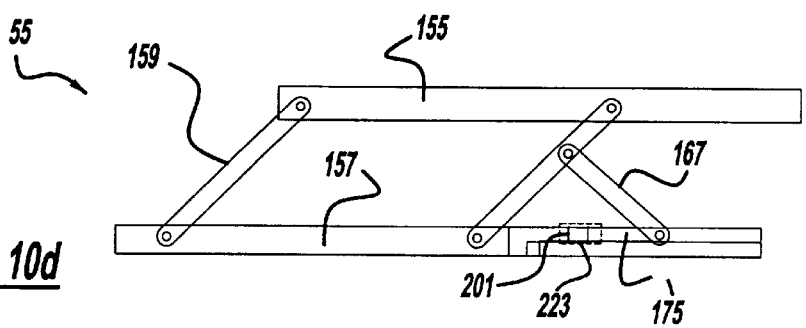

The disengagement of hook 201 from hole 223 is coordinated with the operation of leading linkage 159 and scissor linkage 161 so that the linkages are nearly fully collapsed when hook 201 becomes disengaged from hole 223 as shown in FIGS. 8 and 10b; this constitutes a partially open sunroof position. FIG. 10a shows linkage mechanism 55 moved to essentially a fully open position, wherein hook 201 has been disengaged from hole 223, thereby allowing slide block 157 and lifting block 175 to move in unison. The reverse sequence of operation, due to electric motor 99 pushing cable 203, causes a mirrored reversal of operation. Front linkage mechanism 53, as shown in FIGS. 5 and 6, acts as a follower or slave mechanism to couple sunroof panel 47 to a slide block movable within track 57. It should be appreciated that a camming mechanism may alternately be used instead of the disclosed linkages but with frictional and motor spike disadvantages.

Figure 13:
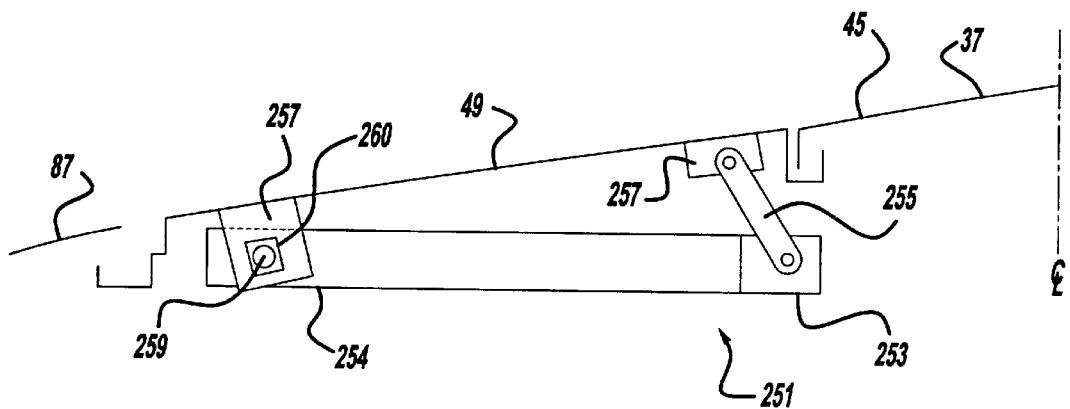
FIG. 13 is a diagrammatic rear view showing a second linkage mechanism employed in the first preferred embodiment automotive vehicle roof system, disposed in the closed position.
Figure 13A:
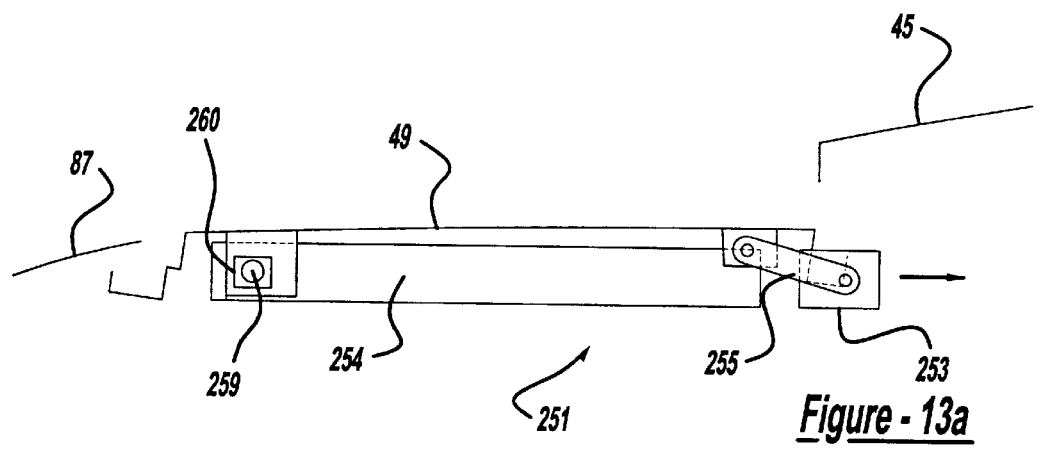
FIG. 13a is a diagrammatic rear view showing the second linkage mechanism employed in the first preferred embodiment automotive vehicle roof system, disposed in a lowered and partially open position.

A linkage mechanism 251 used at the front and rear of second sunroof panel 49 can be observed in FIGS. 13 and 13a. A polymeric leading slide block 253 is slidably movable within a respective channel of the corresponding track 57 or 59 (see FIG. 5). Leading slide block 253 is driven by a sunroof cable actuated by an electric motor such as 99 (see FIG. 5). This exemplary linkage mechanism 251 employs a single link 255 rotatably coupling a carriage 257 to leading slide block 253, adjacent the inwardly facing edge of sunroof panel 49. An opposite portion of carriage 257 is rotatably coupled directly to a trailing slide block 254 by way of a pivot pin 259. Based on the natural curve of stationary roof panel 37 and the desired retracted position of sunroof panel 49, a scissor linkage would not be needed, but alternately may be employed to open and close sunroof panel 49 in the event of differing roof geometries. In operation, the corresponding electric motor is energized by a microprocessor controlled by a vehicle occupant operated switch, which then serves to pull the sunroof cable and leading slide block 253. Any of a variety of known catches 260 may be used to initially retain block 254 in its outboard position while slide block 253 is moved toward the center of the vehicle. For example, catch 260 may consist of a movable pin affixed to the upstanding wall of the corresponding track (i.e., track 57 or 59). A biasing means, such as a spring or resilient elastomeric material, urges the pin toward an extended position, wherein the pin protrudes into a recess located in carriage 257. The magnitude of the biasing force is large enough to prevent block 254 from moving during the initial pivoting of link 255, but small enough to be overcome by the force of the electric motor after link 255 is fully collapsed. Momentarily retaining block 254 allows link 255 to collapse the inboard portion of sunroof panel 49 from that shown in FIG. 13 to the collapsed position of FIG. 13a. Further pulling of leading slide block 253 toward the vehicle centerline causes catch 260 to release, thereby allowing retracting movement of trailing block 254 along track 59. If needed, a hook and slot detenting arrangement can be used like that shown in FIGS. 8 and 9. The reverse sequence of operation, due to the electric motor pushing the sunroof cable, causes a mirrored reversal of operation.

Figure 14:
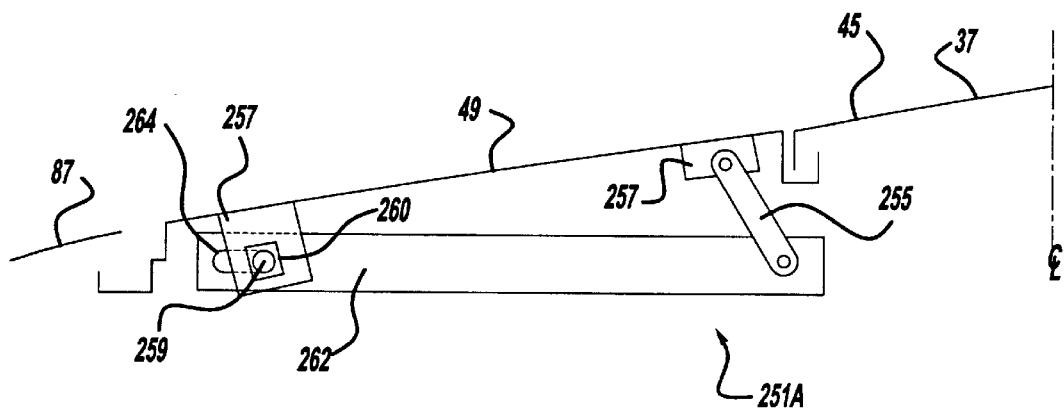
FIG. 14 is a diagrammatic rear view showing an alternate configuration of the second linkage mechanism employed in the first preferred embodiment automotive vehicle roof system, disposed in the closed position.
Figure 14A:
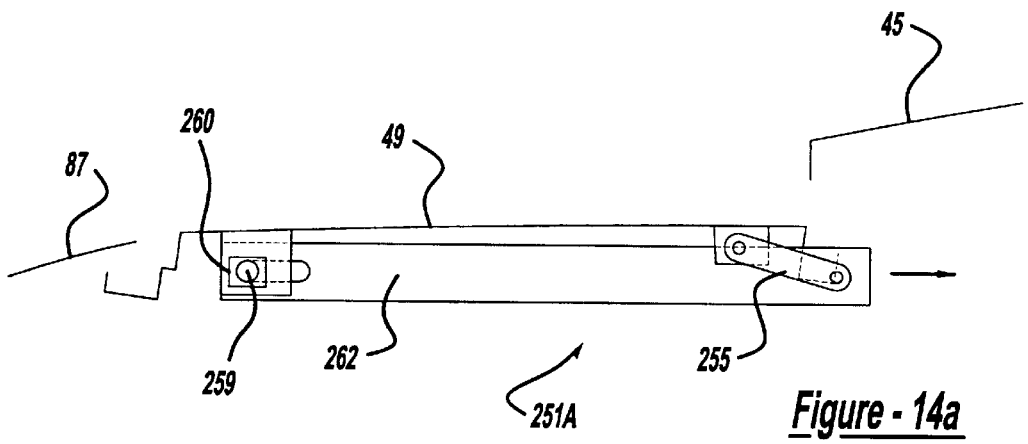
FIG. 14a is a diagrammatic rear view showing the alternate configuration of the second linkage mechanism employed in the first preferred embodiment automotive vehicle roof system, disposed in a lowered and partially open position.

An alternative configuration of linkage mechanism 251 is shown in FIG. 14. Rather than using two separate slide blocks, a linkage mechanism 251A has a single slide block 262 that is used in place of blocks 253 and 254 of linkage mechanism 251. An elongated slot 264 is used to engage pin 259 with slide block 262. As shown FIG. 14a, elongated slot 259 allows slide block 262 to be pulled inboard to collapse the inboard portion of sunroof panel 49 before moving linkage mechanism 251A and sunroof panel 49 to their fully open position.

Figure 2:
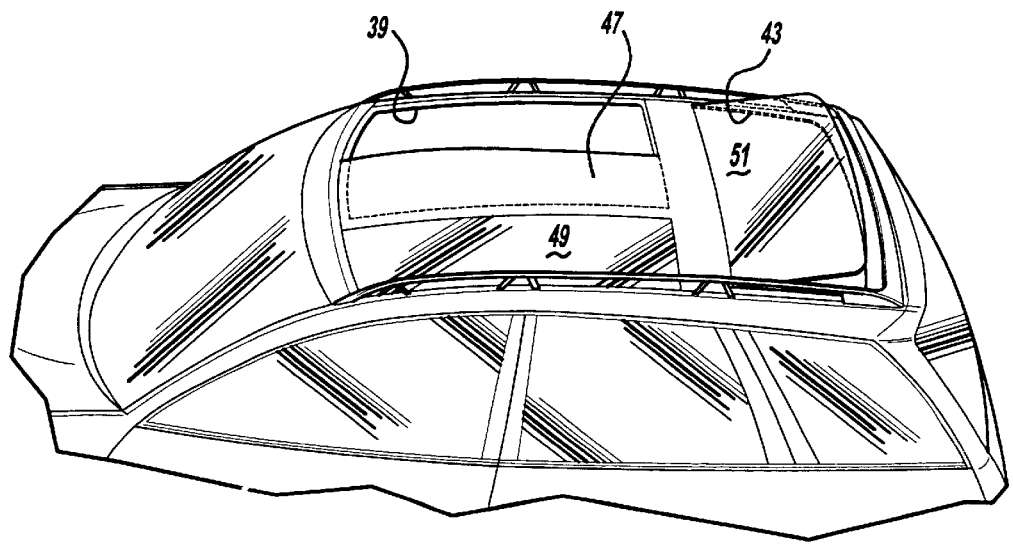
FIG. 2 is a perspective view showing the first preferred embodiment automotive vehicle roof system, with a front one of the sunroof panels disposed in an open position, a second of the front sunroof panels disposed in a closed position and a rear sunroof panel disposed in a tilted venting position.
Figure 11:
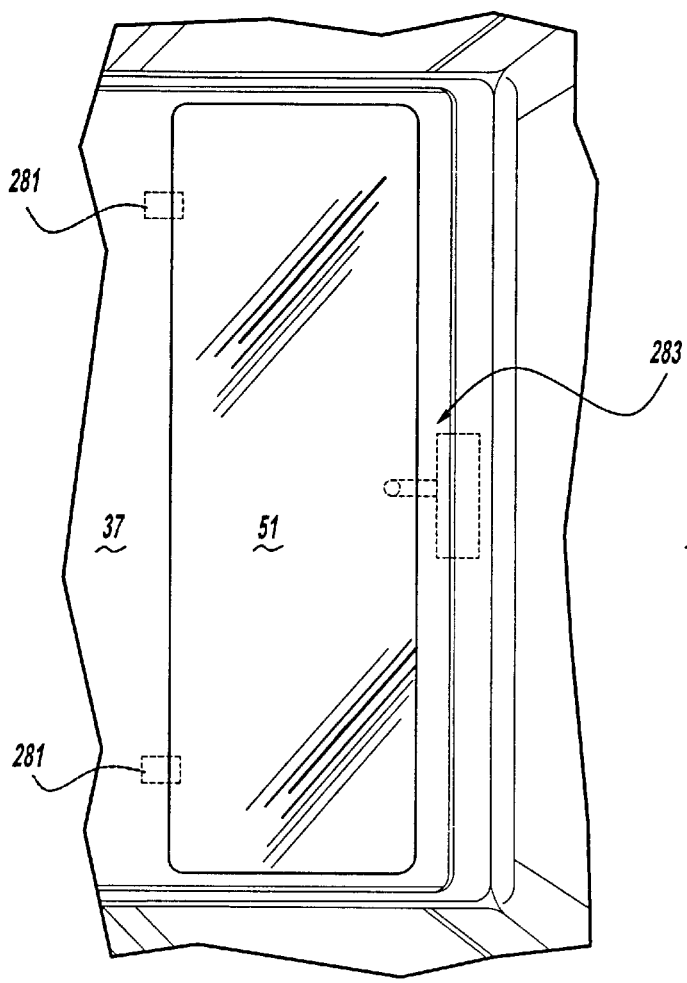
FIG. 11 is a fragmentary top elevational view, showing the rear sunroof panel employed in the first preferred embodiment automotive vehicle roof system.
Figure 12:
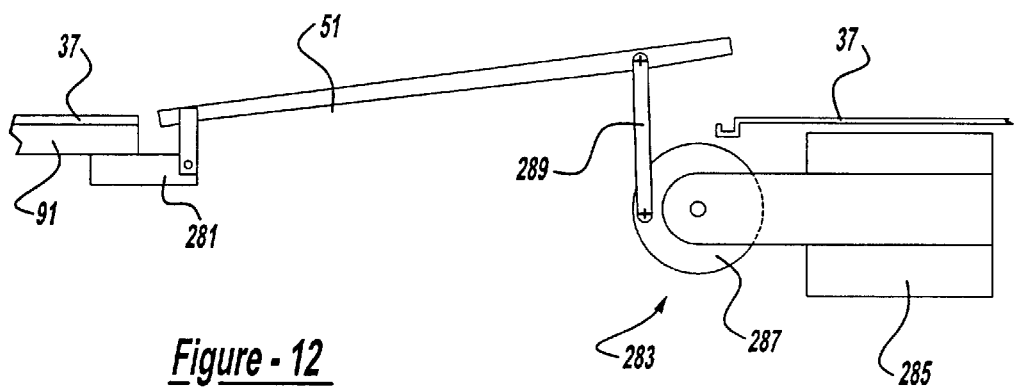
FIG. 12 is a diagrammatic side view showing an actuator and the rear sunroof panel employed in the first preferred embodiment automotive vehicle roof system.

Referring now to FIGS. 11 and 12, rear sunroof panel 51 is coupled to stationary roof panel 37 by a pair of forward hinges 281 and a rear tilting mechanism 283. Rear tilting mechanism 283 includes a reversible electric motor 285 which serves rotate a drive wheel or gear 287. A link or rod 289 has a first end rotatably coupled to a fixed pivot point on wheel 287 and an opposite end rotatably coupled to rear sunroof panel 51 by way of a bracket or the like. Therefore, actuation of electric motor 285 causes wheel 287 to rotate from a closed and lowered window position to an upwardly tilted and open sunroof position. FIG. 12 shows rear sunroof panel 51 tilted to an intermediate venting position approximately halfway between a lowered closed position and a fully venting position as shown in FIG. 2.

Figure 15:
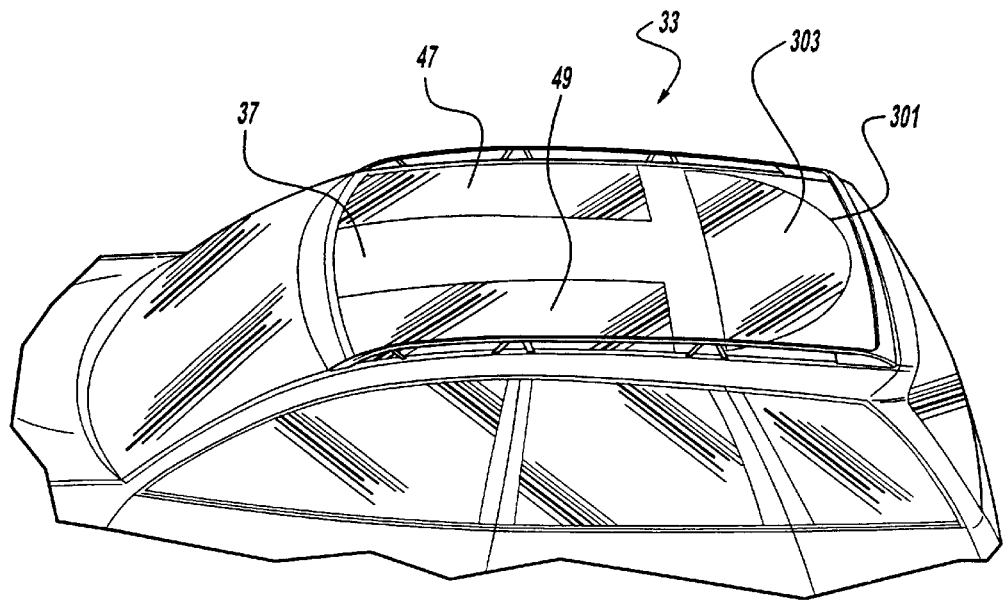
FIG. 15 is a perspective view showing a second preferred embodiment of the automotive vehicle roof system of the present invention, with sunroof panels disposed in closed positions.
Figure 16:
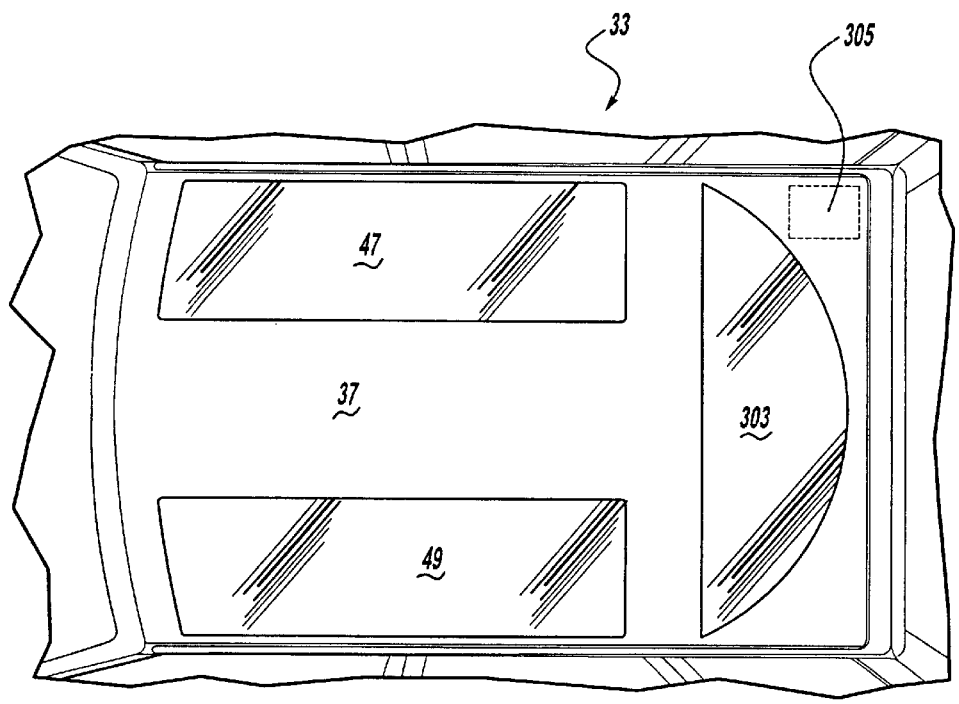
FIG. 16 is a top elevational view showing the second preferred embodiment automotive vehicle roof system, with the sunroof panels disposed in the closed positions.

FIGS. 15 and 16 illustrate a second preferred embodiment of the automotive vehicle roof system 33 of the present invention. In this embodiment, front sunroof panels 47 and 49 are essentially the same as with the first preferred embodiment. However, in the present second preferred embodiment, the rear edge 301 of a rear sunroof panel 303, and the corresponding sunroof opening, have a curved and partially circular top view shape of approximately ⅓ of a circle. This is only done for aesthetic reasons although additional structural room is provided in the rear corners of the vehicle for headliner mounted audio speakers, assist handles or lamps 305. The illustrated roof rack may be readily omitted.

Figure 18:
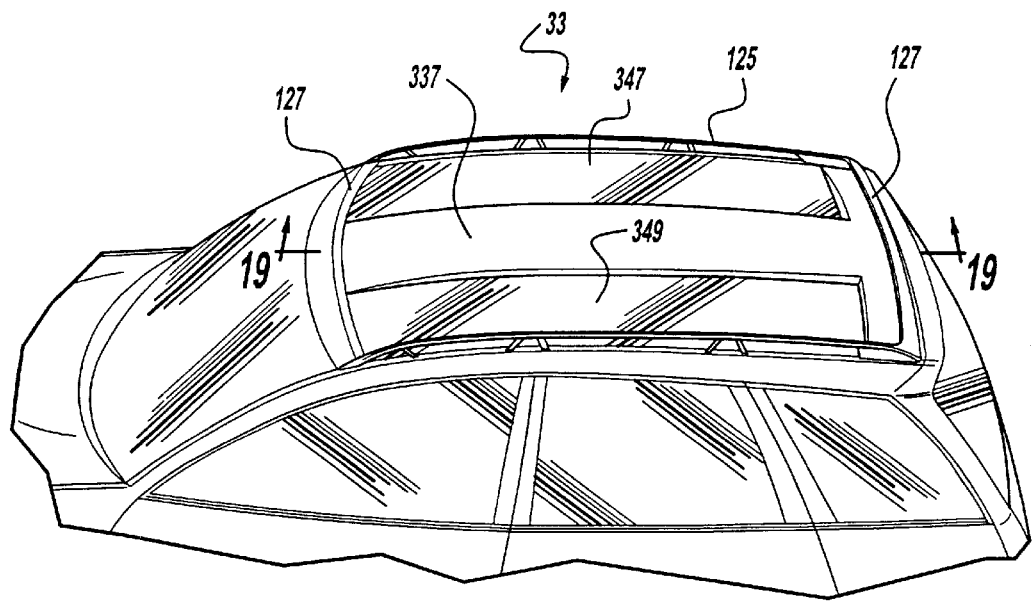
FIG. 18 is a perspective view showing a third preferred embodiment of the automotive vehicle roof system of the present invention, with sunroof panels disposed in closed positions.

Referring now to FIGS. 18 and 19, a third preferred embodiment of the automotive vehicle roof system 33 of the present invention provides a pair of sunroof panels 347 and 349 separated by a stationary roof panel 337. Sunroof panels 347 and 349 extend almost entirely, and significantly greater than a majority, of the fore-and-aft roof surface of the vehicle between the vehicle front and rear headers. This embodiment of sunroof system 33 is preassembled as a modularized unit. Sunroof panels 347 and 349 are inwardly retractable from the closed positions shown in FIG. 18 to the fully open and overlapping positions shown in FIG. 19. In their fully open positions, a majority if not all of sunroof panels 347 and 349, as well as the respective sunshades 351 and 353, are retracted beneath the centerline section of the stationary roof panel 337. In this embodiment, electric motors 399 are mounted between a headliner 389 and the roof structure for operably driving sunroof panels 347 and 349, and sunshades 351 and 353, in an automatically powered manner.

Figure 21:
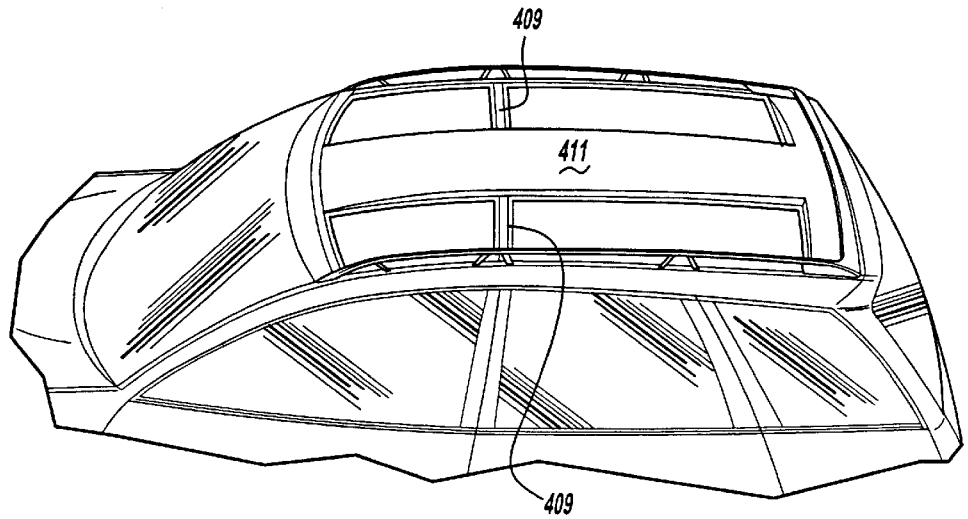
FIG. 21 is a perspective view showing the fourth preferred embodiment automotive vehicle roof system, with the sunroof panels disposed in open positions.

A fourth preferred embodiment of the automotive vehicle roof system 33, shown in FIGS. 20 and 21, is similar to that of the immediately prior embodiment except that four sunroof panels 401, 403, 405 and 407 are employed. Front sunroof panels 401 and 403 are separated from rear sunroof panels 405 and 407 by a stationary cross-car roof panel section 409, also known as an externally exposed roof bow. Notwithstanding, all of the sunroof panels 401, 403, 405 and 407 inwardly retract from the closed positions shown in FIG. 20 to the open positions shown in FIG. 21 by being retracted beneath the fore-and-aft oriented centerline section of stationary roof panel 411. The addition of cross-car section 409 provides additional structural strength and rigidity to the stationary roof panel 411 as well as the corresponding sunroof panels and mechanisms during shipping and after installation.

Figure 22:
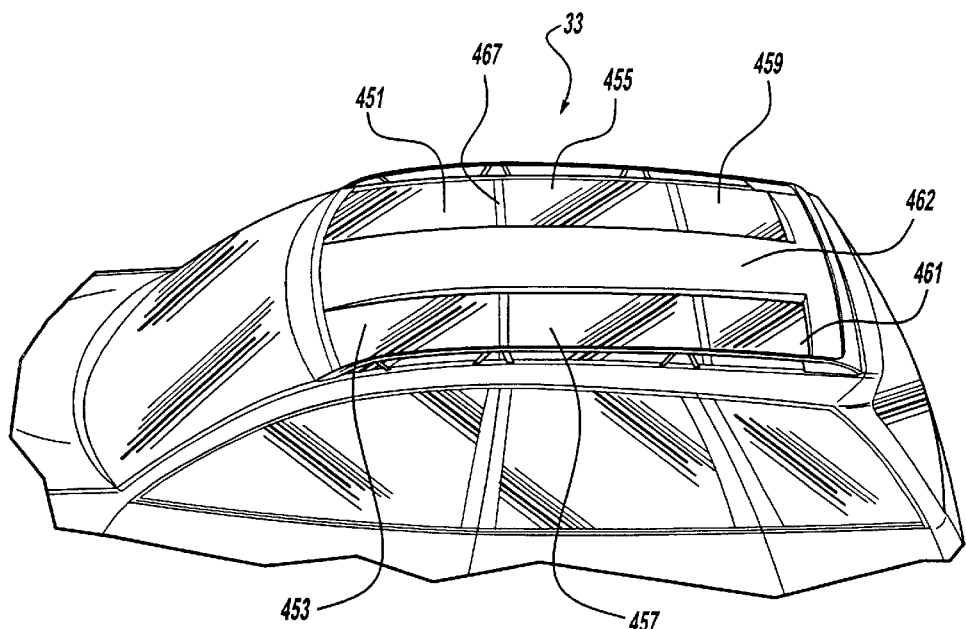
FIG. 22 is a perspective view showing a fifth preferred embodiment of the automotive vehicle roof system of the present invention, with sunroof panels disposed in closed positions.
Figure 23:
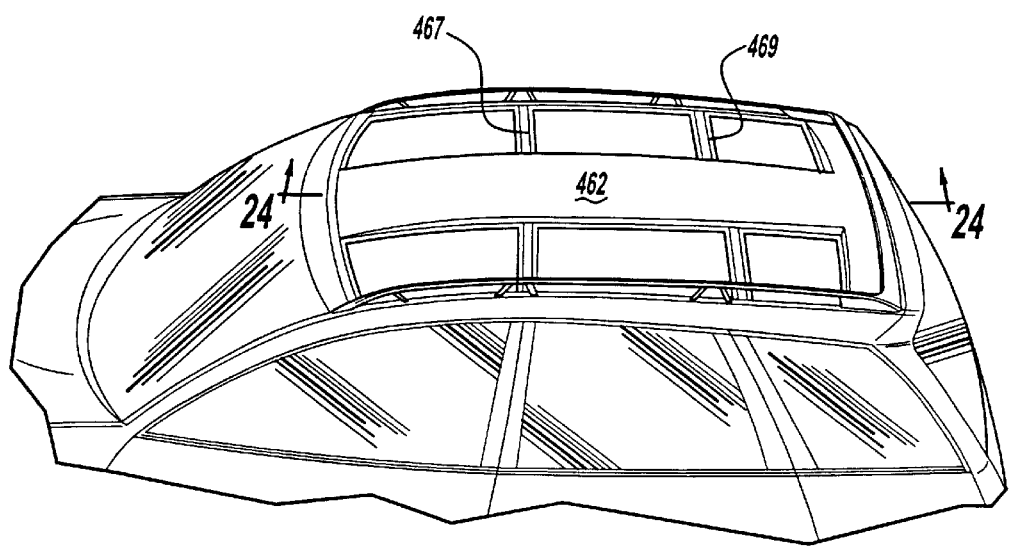
FIG. 23 is a perspective view showing the fifth preferred embodiment automotive vehicle roof system, with the sunroof panels disposed in open positions.
Figure 24:
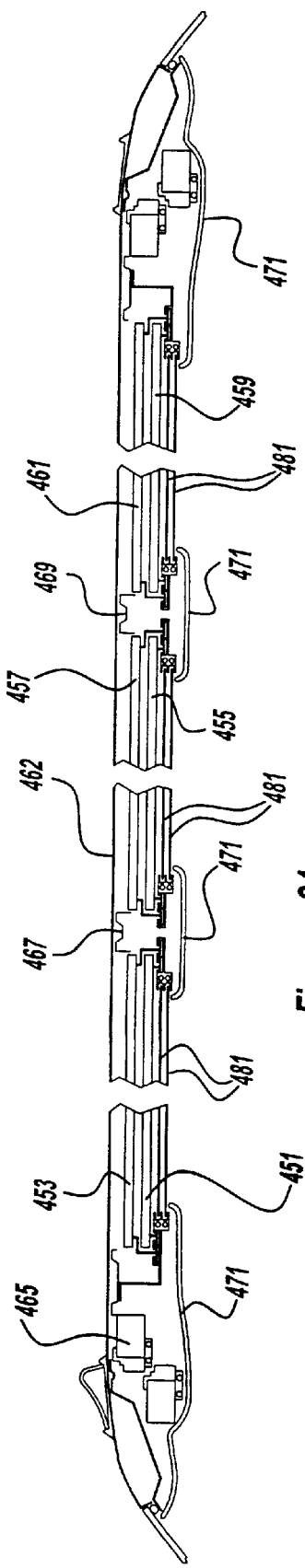
FIG. 24 is a cross sectional view, taken along line 24—24 of FIG. 23, showing the sunroof panels and sunshades of the fifth preferred embodiment automotive vehicle roof system, disposed in the open positions.

Similarly, a fifth preferred embodiment of the automotive vehicle roof system 33 is shown in FIGS. 22–24. In this embodiment, six separate sunroof panels 451, 453, 455, 457, 459 and 461, and sunshades 481 are all inwardly retractable toward the vehicle centerline and below the centerline section of a stationary roof panel 462, from the closed positions illustrated in FIG. 22 to the open positions illustrated in FIGS. 23 and 24. An electric motor is provided for each sunroof panel and each sunshade. The front sunroof panels 451 and 453 are separated from the middle sunroof panels 455 and 457 by a first cross-car panel section 467 while a second cross-car roof section 469 separates the middle sunroof panels from the rear sunroof panels 459 and 461. Additional hard plastic or headliner-like interior trim panels 471 are used to cover the interior of the structural roof panels and reinforcements. Additional cross-car panel sections 467 and 469 add additional structural rigidity to the stationary roof panel 462 as well as to the sunroof panels and vehicle. They also allow for individualized and independent opening of the sunroof panels above each vehicle occupant separate from the others. Again, all of the presently disclosed embodiments are installable as a single modularized unit.

While the preferred embodiments of the automotive vehicle roof system have been disclosed, it should be appreciated that various other modifications may be made and fall within the scope of the present invention. For example, the sunroof mechanisms and panels may allow for a tilted venting of one or more of the sunroof panels instead or in addition to full opening movement. Additionally, a spoiler-type sunroof construction can be used in place of the tilting rear sunroof disclosed. The sunroof panels and mechanisms disclosed herein may also be employed in a non-modularized unit, although full advantage of the present invention will not be achieved. Furthermore, while it is desired that each sunroof panel will be independently movable relative to the others, it is also envisioned that various preprogrammed or mechanically connected combinations can be used such that pairs of sunroofs and/or sunshades can be opened simultaneously and not independently. Moreover, stationary glass panels can be provided in one or more locations intended to be moving, thereby providing the beneficial appearance of the present invention without the associated mechanism expense for lower priced vehicles. Finally, the disclosed stationary roof can alternately be glass. While various materials have been disclosed, it should be appreciated that a variety of other materials can be employed. It is intended by the following claims to cover these and any other departures from the disclosed embodiments which fall within the true spirit of this invention.

What is claimed is:

1. An automotive vehicle sunroof system comprising:
   a first sunroof panel having an inboard peripheral edge and an outboard peripheral edge;
   a first mechanism coupled to the first panel, the first mechanism including a scissor linkage being operable to lower the inboard peripheral edge of first panel and a pivoting link being operable to lower the outboard peripheral edge of the first panel when the first panel is slid from a closed position to an open position;
   a second sunroof panel located adjacent the first panel, the second sunroof panel having an inboard peripheral edge and an outboard peripheral edge; and a second mechanism coupled to the second panel, the second mechanism including a pivoting link, the second mechanism being operable to pivotably lower the inboard peripheral edge of the second panel without substantially lowering the outboard peripheral edge of the second panel when the second panel is operably slid in a substantially linear manner from its closed position to its open position;

wherein the first and second panels are slid toward each other in opposite directions when moved from their closed positions to their open positions, and the first and second panels overlap each other when in their open positions; and wherein the mechanisms prevent the panels from being raised substantially vertically above their closed positions.

2. The system of claim 1 further comprising third and fourth sunroof panels operably sliding toward each other when they are moved from their closed positions to their open positions.

3. The system of claim 1 wherein the panels are adjacent to each other in a cross-car direction when in their closed positions and are moved toward a vehicular longitudinal centerline when moved from their closed positions to their open positions, the cross-car direction is oriented substantially perpendicular to the longitudinal centerline.

4. The system of claim 1 wherein the open positions of the panel are below a plane defined by the closed positions of the panels.

5. The system of claim 1 wherein the panels are all pre-assembled to a roof as a modularized unit prior to assembly of the roof to a vehicle.

6. The system of claim 1 further comprising:

the third sunroof panel having an aft peripheral edge;

an automatically powered actuator;

a rotating member that is driven by the third powered actuator;

a link having two ends, the first end of the link being pivotally attached to the rotating member, the second end being pivotally attached to the third sunroof panel at a location along the rear periphery of the third panel, the link operably moving the third panel when the rotating member is driven by the third powered actuator.

7. The system of claim 1 further comprising a third sunroof having a cross-car dimension substantially the same as a cross-car dimension of the combined closed first and second panels, and the third panel being located behind both the first and second panels when all of the panels are in their closed positions.

8. The system of claim 7 further comprising an externally visible and stationary roof section located between the panels when the panels are all in their closed positions, the stationary roof section having a T-shape when viewed from above with an exterior surface of the stationary roof section being substantially co-planar with the panels when in their closed positions.

9. The system of claim 7 wherein the panels are all movable independently of each other.

10. The system of claim 7 wherein the moved position of the third panel is a pivoted venting position with one edge of the third panel remaining substantially unmoved from its orientation in the closed position and with an opposite edge of the third panel being vertically offset from its orientation in the closed position.

11. The system of claim 1 further comprising a third sunroof panel having a rear edge with a partially circular periphery when viewed from above.

12. A sunroof comprising:

a track having a channel defined in part by an upstanding wall with an aperture, the track being elongated in a first direction;

a leading element slidable in the channel;

a member operably pushing and pulling the leading element;

an arm projecting from the leading element, the arm having a hook projecting in a second direction substantially facing the upstanding wall;

a trailing element slidable in the channel, the trailing element having a finger substantially projecting in the second direction;

a linkage assembly coupling the leading element to the trailing element; and a sunroof panel assembly coupled to the linkage assembly;

the hook being slidable relative to the trailing element when the linkage operably lowers the sunroof panel assembly and when the finger of the trailing element engages the aperture of the track;

the hook operably engaging the finger and causing simultaneous movement of the leading and trailing elements when the sunroof panel assembly is moved from a closed position to an open position, and the finger operably disengaging the aperture of the track when the elements move together.

13. The sunroof of claim 12 wherein contact of the hook with the finger acts to disengage an end of the finger from the aperture of the track.

14. The sunroof of claim 12 wherein the finger is flexible and the linkage is a scissor linkage.

15. The sunroof of claim 12 further comprising a trailing pivot coupling the linkage assembly to the trailing element, wherein the arm is slidable between the finger of the trailing element and the trailing pivot.

16. The sunroof of claim 12 further comprising an elongated leading link pivotably coupled to the leading element, and a pivot coupling the leading link to the sunroof panel assembly.

17. The sunroof of claim 12 wherein the meember is a flexible cable and the first direction is defined as a cross-car vehicular direction.

* * * * *